(12) United States Patent
Kim et al.

(10) Patent No.: US 10,348,181 B2
(45) Date of Patent: Jul. 9, 2019

(54) POWER CONTROL APPARATUS FOR SUB-MODULE OF MMC CONVERTER

(71) Applicant: HYOSUNG HEAVY INDUSTRIES CORPORATION, Seoul (KR)

(72) Inventors: June-Sung Kim, Anyang-si (KR); Hong-Ju Jung, Seoul (KR); Jung-Soo Park, Uiwang-si (KR); Doo-Young Lee, Anyang-si (KR); Jong-Yun Choi, Hwaseong-si (KR)

(73) Assignee: HYOSUNG HEAVY INDUSTRIES CORPORATION, Seoul (KR)

(*) Notice: Subject to any disclaimer, the term of this patent is extended or adjusted under 35 U.S.C. 154(b) by 0 days.

(21) Appl. No.: 15/537,696

(22) PCT Filed: Dec. 29, 2015

(86) PCT No.: PCT/KR2015/014446
§ 371 (c)(1),
(2) Date: Jun. 19, 2017

(87) PCT Pub. No.: WO2016/108597
PCT Pub. Date: Jul. 7, 2016

(65) Prior Publication Data
US 2018/0006546 A1 Jan. 4, 2018

(30) Foreign Application Priority Data

Dec. 29, 2014 (KR) .................. 10-2014-0192744
Dec. 29, 2014 (KR) .................. 10-2014-0192746

(51) Int. Cl.
*H02M 1/08* (2006.01)
*H02J 1/00* (2006.01)
(Continued)

(52) U.S. Cl.
CPC .............. *H02M 1/08* (2013.01); *H02J 1/00* (2013.01); *H02M 3/04* (2013.01); *H02M 7/19* (2013.01);
(Continued)

(58) Field of Classification Search
None
See application file for complete search history.

(56) References Cited

U.S. PATENT DOCUMENTS

| | | | |
|---|---|---|---|
| 5,412,555 A | 5/1995 | Uramoto | |
| 7,123,488 B2 | 10/2006 | Hirabayashi et al. | |
| 2002/0027787 A1* | 3/2002 | Nishida | H02M 3/3385 363/21.16 |

FOREIGN PATENT DOCUMENTS

| | | |
|---|---|---|
| JP | 2011-024392 A | 2/2011 |
| JP | 2011-114920 A | 6/2011 |
| WO | 2014-091801 A1 | 6/2014 |

OTHER PUBLICATIONS

Power Supply Failure Alarm Circuit Electronic, Electronic Circuit Diagram, Apr. 1, 2012, source from www.circuitdiagram.net.

* cited by examiner

*Primary Examiner* — Jue Zhang
*Assistant Examiner* — Henry E Lee, III
(74) *Attorney, Agent, or Firm* — Novick, Kim & Lee, PLLC; Jae Youn Kim (57) ABSTRACT

Provided is a power control apparatus for sub-modules in an MMC, which controls stable supply of power to sub-modules in MMC connected to an HVDC system and a STATCOM. The power control apparatus has at least one first resistor connected between P and N buses of MMC; a second resistor connected in series with the first resistor; a switch connected in series with the second resistor; a third resistor connected in parallel with the second resistor and the
(Continued)

switch which are connected in series; a Zener diode connected in parallel with the third resistor; and a DC/DC converter connected between both ends of the Zener diode and configured to convert voltage across both ends of the Zener diode into low voltage, and supply the low voltage to the sub-modules, wherein a magnitude of current flowing through the Zener diode is controlled depending on ON/OFF switching of the switch.

15 Claims, 6 Drawing Sheets

(51) Int. Cl.
    *H02M 7/19*     (2006.01)
    *H02M 3/04*     (2006.01)
    *H02M 7/217*    (2006.01)
    *H02M 7/49*     (2007.01)
    *H02M 1/00*     (2006.01)
    *H02M 7/483*    (2007.01)
(52) U.S. Cl.
    CPC ............. *H02M 7/217* (2013.01); *H02M 7/49* (2013.01); *H02M 2001/0006* (2013.01); *H02M 2001/0009* (2013.01); *H02M 2001/0048* (2013.01); *H02M 2007/4835* (2013.01)

FIG. 1

"PRIOR ART"

FIG. 2

"PRIOR ART"

POWER CONTROL APPARATUS FOR SUB-MODULE OF MMC CONVERTER

TECHNICAL FIELD

The present invention generally relates to a power control apparatus and, more particularly, to a power control apparatus for sub-modules in a Modular Multilevel Converter (MMC), which controls the stable supply of power to sub-modules in an MMC connected to a High Voltage Direct Current (HVDC) system and to a Static Synchronous Compensator (STATCOM).

BACKGROUND ART

Generally, in High Voltage Direct Current (HVDC) systems, Alternating Current (AC) power produced in a power plant is converted into DC power and the DC power is transmitted, and a power receiving stage re-converts the DC power into AC power and supplies the AC power to a load. Such an HVDC system is advantageous in that power may be efficiently and economically transmitted via voltage boosting, and in that connections between heterogeneous systems and long-distance high-efficiency power transmission are possible. Further, a Static Synchronous Compensator (STATCOM) is a kind of Flexible AC Transmission System (FACTS) device, and denotes an electric power electronics-based compensator, which is connected to a power system and is used to increase power transmission capacity and to maximize the usage of existing facilities. Such a STATCOM system is advantageous in that power systems are compensated in parallel using a voltage-type power semiconductor device, thus stabilizing the systems by maintaining voltage at a constant value.

An MMC may be connected to an HVDC system or a STATCOM. In such an MMC, multiple sub-modules are connected in series. In the MMC, a sub-module is one of the most important components. Therefore, in order for sub-modules to operate normally in various environments, there is a need to stably supply power to the sub-modules. Further, in the MMC, sub-modules become a current path through which voltage is converted and power is transmitted. Since loss occurring during the operation of sub-modules negatively influences the efficient operation of the sub-modules, efforts to minimize such loss have been continuously made.

Figure 1:
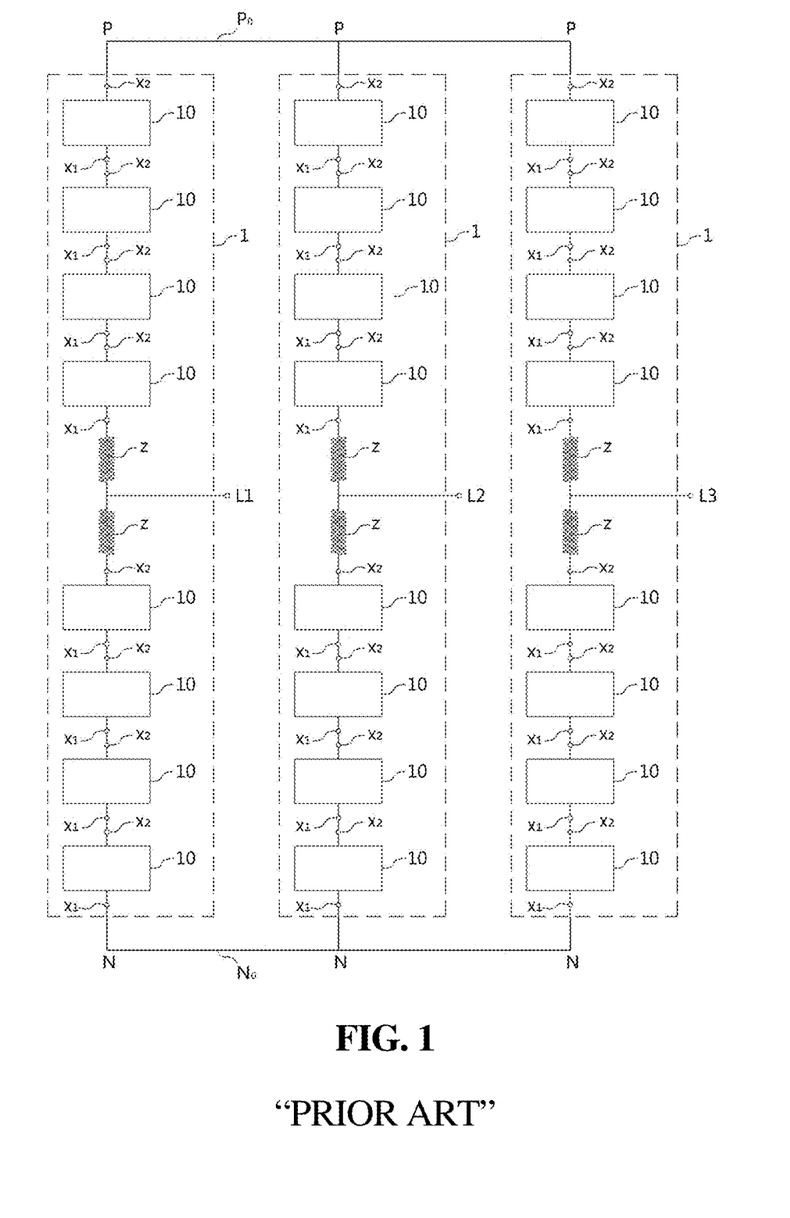
FIG. 1 is an equivalent circuit diagram of a typical MMC.
Figure 2:
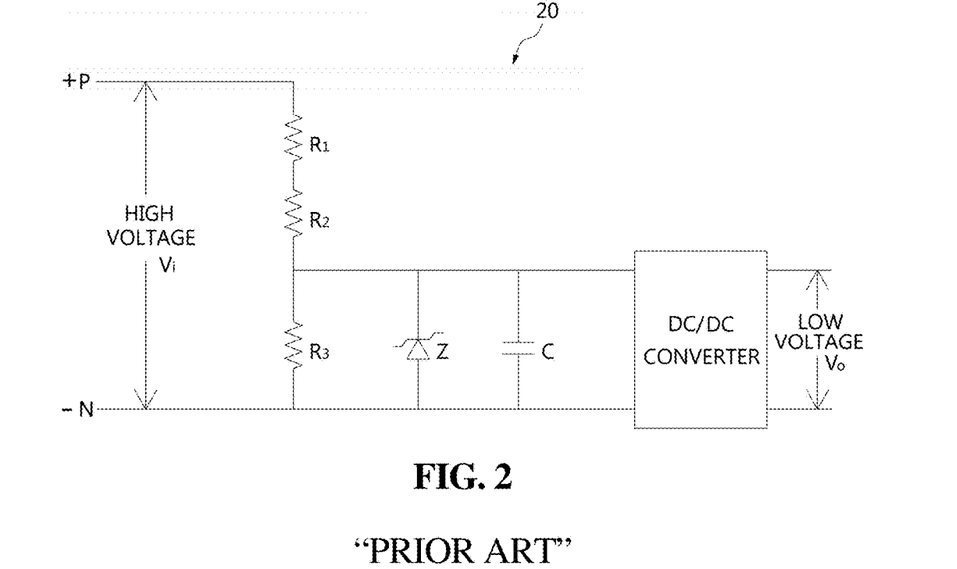
FIG. 2 is a circuit diagram of a conventional power control apparatus for sub-modules in an MMC.

FIG. 1 is an equivalent circuit diagram of an MMC, and FIG. 2 is a circuit diagram of a conventional power control apparatus for MMC sub-modules. As is well-known to those skilled in the art, an MMC is composed of one or more phase modules 1, and individual sub-modules 10 are connected in series in each phase module 1. Further, DC voltage terminals of each of the phase modules 1 are connected to positive (+) and negative (−) DC voltage buses P and N, respectively. A high DC voltage is present between the DC voltage P and N buses. In each sub-module 10, two connection terminals X1 and X2 are formed.

A conventional power control apparatus 20 for MMC sub-modules converts a high voltage (about 2 to 3 kV) on the P and N buses into a low voltage (about 300 to 400 V) so as to supply the power required to operate the sub-modules. Here, in order to maintain high reliability depending on the characteristics of the HVDC system, the coupling of resistors R and a Zener diode Z is used. For example, current is limited using specific resistors R1 and R2, among multiple resistors R1 to R3 connected in series between the P and N buses, and the high voltage is converted into the low voltage using the Zener diode Z.

However, the conventional power control apparatus 20 is problematic in that loss occurs due to heat generated in the resistors R1 and R2 for current limiting, and such heat generation may negatively influence the overall operation of the power control apparatus because it is closely related to the reliability of elements. Thus, there is inconvenience in that a heat dissipation plate for preventing heat generation must be separately attached.

Further, the sub-modules of the MMC connected to the HVDC system accommodate voltages falling within a very wide range (0 to 3 kV), and must drive the MMC by combining the voltages, and thus the power of the sub-modules must be normally supplied at a voltage of 800 V or less. For this reason, if current-limiting resistors R1 and R2 are selected so that the control power is normally output in a range of 800 V, and the input voltage is increased up to 3 kV, high current flows through the resistors R1 and R2, thus increasing loss and resulting in heat generation.

At the same time, most of the increased current flows into the Zener diode Z, so that high heat is generated in the Zener diode Z, thus greatly deteriorating the reliability of the apparatus. The reason for this is that the resistance of the Zener diode Z is lower than the line resistance of the resistor R3.

In the case of the current-limiting resistors R1 and R2, heat dissipation may be smoothly performed using a heat dissipation plate, but, in the case of the Zener diode Z, a problem arises in that it is difficult to attach a heat dissipation plate or the like, for the reason of increased volume or the like.

Therefore, in the field of this art, there is required the development of technology for a power control apparatus, which enables power control to be stably performed while minimizing the loss of current-limiting resistors without requiring the installation of additional elements in the sub-modules of an MMC connected to an HVDC system.

DISCLOSURE

Technical Problem

An object of the present invention is to provide a power control apparatus for sub-modules in an MMC, which prevents the generation of heat in internal elements and minimizes loss in the elements when the MMC, connected to an HVDC system and to a STATCOM, converts a high voltage into a low voltage and supplies the low voltage to the sub-modules in the MMC.

Another object of the present invention is to provide a power control apparatus for sub-modules in an MMC, which minimizes the burden on a Zener diode depending on the ON/OFF switching operations of switching elements connected in series with current-limiting resistors.

Technical Solution

A power control apparatus for sub-modules in an MMC according to a first embodiment of the present invention includes at least one first resistor connected between P and N buses of the MMC; a second resistor connected in series with the first resistor; a switch connected in series with the second resistor; a third resistor connected in parallel with the second resistor and the switch, which are connected in series; a Zener diode connected in parallel with the third resistor; and a DC/DC converter connected between both ends of the Zener diode and configured to convert voltage across both ends of the Zener diode into a low voltage, and supply the low voltage to the sub-modules, wherein a magnitude of current flowing through the Zener diode is controlled depending on ON/OFF switching of the switch.

In the first embodiment, the third resistor may have a resistance greater than that of the second resistor.

In the first embodiment, voltage across the P and N buses may increase or decrease in a range from 0 to a preset maximum voltage (Vmax).

In the first embodiment, in a low-voltage section, in which the voltage across the P and N buses ranges from 0 V to a first voltage, the switch may be turned off, thus preventing current from flowing through the second resistor.

In the first embodiment, in a high-voltage section, in which the voltage across the P and N buses ranges from the first voltage to the maximum voltage (Vmax), the switch may be turned on, thus enabling current to flow through the second resistor.

In the first embodiment, the first voltage may be determined according to a magnitude of current flowing through the Zener diode.

In the first embodiment, the power control apparatus may further include a current detection unit for detecting a magnitude of current flowing through the Zener diode, wherein, in a state in which the switch is initially turned off, voltage across the P and N buses may increase from 0 V to a preset maximum voltage (Vmax), and the switch alternately performs on/off switching depending on the current flowing through the Zener diode, detected by the current detection unit, thus enabling supply of the current to the second resistor and blocking of the supply of the current to be repeated.

In the first embodiment, the current flowing through the Zener diode may be maintained at or below a preset reference value by varying a duty ratio of ON/OFF switching of the switch.

A power control apparatus for sub-modules in an MMC according to a second embodiment of the present invention includes at least one first resistor connected between P and N buses of the MMC; a second resistor connected in series with the first resistor; at least one third resistor connected in parallel with the first resistor and the second resistor, which are connected in series; a Zener diode connected in series with the third resistor; a switch connected between a junction of the first resistor and the second resistor and a junction of the third resistor and the Zener diode; and a DC/DC converter connected between both ends of the Zener diode and configured to convert voltage across both ends of the Zener diode and transmit a resulting voltage to sub-modules, wherein a magnitude of current flowing through the Zener diode is controlled depending on ON/OFF switching of the switch.

In the second embodiment, the third resistor may have a resistance greater than that of the second resistor.

In the second embodiment, voltage across the P and N buses may increase or decrease in a range from 0 to a preset maximum voltage (Vmax).

In the second embodiment, in a low-voltage section, in which the voltage across the P and N buses ranges from 0 V to a first voltage, the switch may be shorted, thus enabling current flowing through the first resistor and current flowing through the third resistor to flow through the Zener diode.

In the second embodiment, in a high-voltage section, in which the voltage across the P and N buses ranges from the first voltage to the maximum voltage (Vmax), the switch may be opened, thus preventing the current flowing through the first resistor from being supplied to the Zener diode and enabling the current flowing through the third resistor to flow through the Zener diode.

In the second embodiment, the first voltage may be determined according to a magnitude of the current flowing through the Zener diode.

In the second embodiment, the power control apparatus may further include a diode connected in series with the switch.

Advantageous Effects

According to the present invention, loss occurring in current-limiting resistors and a Zener diode constituting the power control apparatus for sub-modules in an MMC may be minimized, and the generation of heat may be prevented, and thus there is no need to attach an additional device, such as a heat dissipation plate for a Zener diode.

Further, according to the present invention, the burden on a Zener diode used in the power control apparatus may be reduced, so that the Zener diode may be implemented to be as small as possible, thus enabling the implementation of a small and lightweight apparatus.

BEST MODE

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Further, terms such as "first", "second", "A", "B", "(a)", and "(b)" may be used to describe the components of the present invention. These terms are merely used to distinguish relevant components from other components, and the substance, sequence or order of the relevant components is not limited by the terms. It should be understood that a representation indicating that a first component is "linked", "coupled", or "connected" to a second component includes not only the case where the first component is directly coupled or connected to the second component but also cases where a third component is "linked", "coupled" or "connected" between the first and second components.

Figure 3:
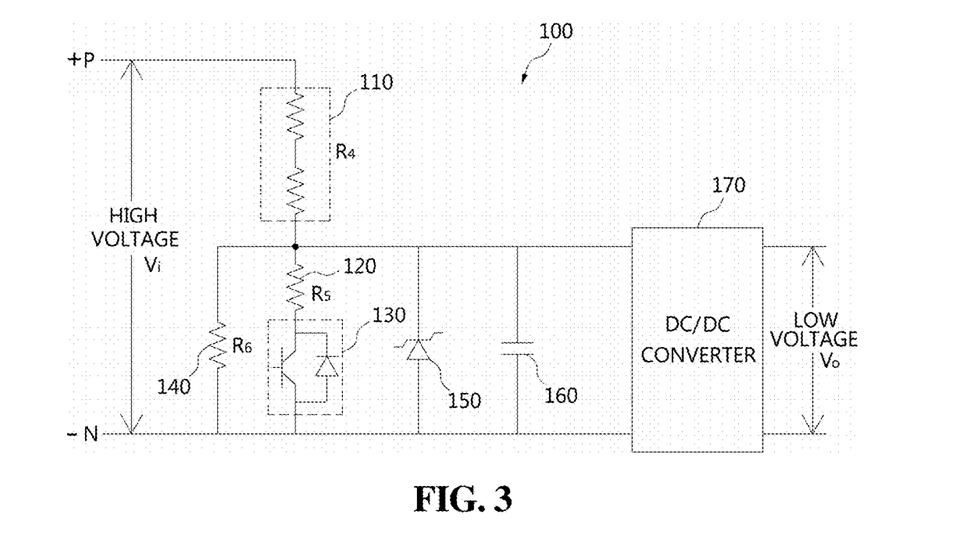
FIG. 3 is a circuit diagram showing a power control apparatus for sub-modules in an MMC according to a first embodiment of the present invention.

FIG. 3 is a circuit diagram showing a power control apparatus for sub-modules in an MMC according to a first embodiment of the present invention.

Referring to FIG. 3, a power control apparatus 100 for MMC sub-modules according to a first embodiment of the present invention is configured such that an MMC having one or more phase modules supplies power to operate multiple sub-modules constituting each phase module. For this, the power control apparatus 100 according to the present invention converts the high voltage across positive (+) P and negative (−) N buses, to which each phase module is connected, into the low voltage required for the operation of the sub-modules, and supplies the low voltage. Such an MMC is connected both to an HVDC system and to a STATCOM.

The power control apparatus 100 according to the first embodiment of the present invention includes at least one first resistor R4 110, connected between the P and N buses of the MMC, and a second resistor R5 120, connected in series with the first resistor R4 110. The first resistor 110 is implemented such that one or more resistors are connected in series. A switch 130 is connected in series with the second resistor 120. The switch 130 may be implemented in various manners using a mechanical switch, a relay contact switch, or a semiconductor switch element. For example, an Insulated-Gate Bipolar Transistor (IGBT) or a Field Effect Transistor (FET) may be used as the semiconductor switch element. When a mechanical switch or a relay contact switch is used, a backward diode for limiting the flow of current is preferably connected in series therewith. The ON/OFF switching operation of the switch 130 is controlled by a control unit (not shown). Since the switch 130 is connected in series with the second resistor 120, current is allowed to flow into or is prevented from flowing into the second resistor 120 depending on the ON/OFF switching operation.

Further, the power control apparatus 100 according to the present invention includes a third resistor R6 140, which is connected in parallel with the second resistor 120 and the switch 130, which are connected in series, and also includes a Zener diode 150 and a capacitor 160, which are connected in parallel with the third resistor 140. The Zener diode 150 exhibits characteristics identical to those of a normal diode in a forward direction from the N bus to the P bus, but current does not flow through the Zener diode 150 (i.e. only very low current flows) upon the application of reverse voltage. Then, when the voltage exceeds a Zener knee voltage, Zener breakdown occurs, and then the Zener diode is reversely biased and current flows through the Zener diode in a reverse direction. Therefore, referring to the drawing, although low current cannot flow in the reverse direction from the P bus to the N bus, reverse current flows in the direction from the P bus to the N bus when a reverse bias occurs. The capacitor 160 functions to maintain a constant voltage.

Furthermore, the power control apparatus 100 according to the present invention includes a DC/DC converter 170 connected between both output terminals of the Zener diode 150 and the capacitor 160 and configured to receive the voltage across the two ends of the Zener diode 150, convert the voltage into the low operating voltage required for subsequent sub-modules, and supply the low operating voltage to the sub-modules. The voltage input to the DC/DC converter 170 changes depending on the ON/OFF switching operation of the switch 130.

Meanwhile, the power control apparatus 100 according to the present invention may further include a current detection unit 180 for detecting current flowing into the Zener diode 150. The current detection unit 180 may detect current in various forms. For example, current may be detected either using a current sensor, as shown in the drawing, or using the voltage across the two ends of a resistor (not shown) connected in series with the Zener diode 150. The current value detected by the current detection unit 180 is input to a control unit (not shown). Then, the control unit adjusts the magnitude of current flowing through the Zener diode 150 by controlling ON/OFF switching of the switch 130 using the received current value. Throughout the present invention, the term "ON" of the switch 130 denotes the state in which a line is shorted and current passes through the line, and the term "OFF" denotes the state in which the line is opened and the flow of current is blocked.

Figure 4A:
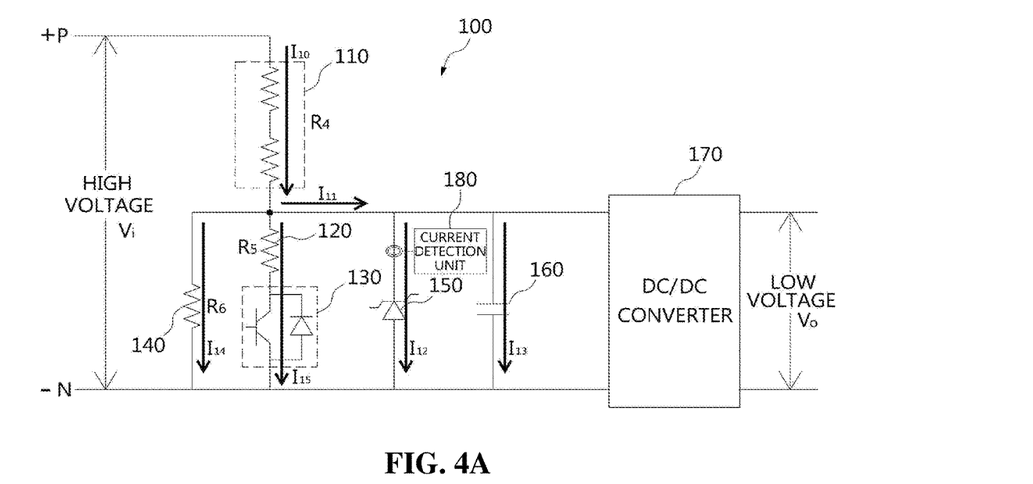
FIGS. 4A and 4B are a schematic diagram of current flow to describe the process in which the power control apparatus for sub-modules in an MMC according to the first embodiment of the present invention controls the power of the sub-modules.
Figure 4B:
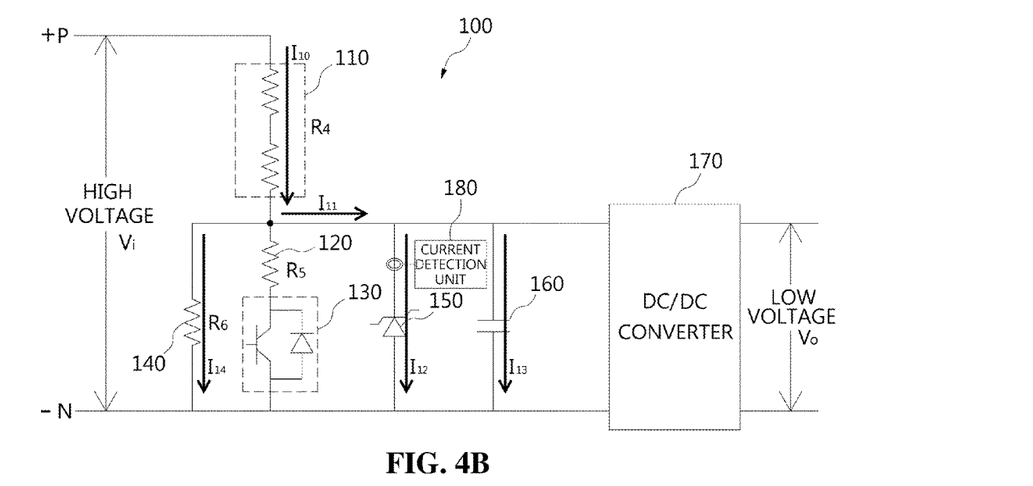

FIGS. 4A and 4B a schematic diagram of current flow to describe a process in which the power control apparatus for sub-modules in an MMC according to the first embodiment of the present invention controls the power of the sub-modules.

FIG. 4A illustrates current flow in the state in which the switch 130 is turned off in a low-voltage section, and FIG. 4B illustrates current flow in the state in which the switch 130 is turned on in a high-voltage section. The power control apparatus 100 for MMC sub-modules according to the present embodiment is intended to reduce the burden on the Zener diode 150 by adjusting the magnitude of current flowing through the Zener diode 150 depending on the ON/OFF switching operation of the switch 130. A high voltage across the P and N buses of the MMC, applied to the present embodiment, increases or decreases in a range from 0 V to a preset maximum voltage Vmax. For the convenience of description, the maximum voltage Vmax will be described as, for example, 3 kV. Therefore, in the present embodiment, the power control apparatus 100 is configured to receive the high voltage across the P and N buses of the MMC, for example, an input voltage of 0 V to 3 kV, convert the high voltage into a low voltage of 300 to 400 V required for the sub-modules, and supply the low voltage to the sub-modules.

For this, as shown in FIG. 4A, the power control apparatus 100 according to the present invention continuously increases the input voltage across the P and N buses from 0 V to 1500 V (hereinafter referred to as a 'first voltage') in the state in which current is prevented from flowing through the second resistor 120 by initially turning off the switch 130 and opening the line. In this section (low-voltage section), the switch 130 is in an OFF state, so that current does not flow through the second resistor 120, thus reducing the loss occurring in the second resistor 120. Therefore, a supply current $I_{10}$ applied through the first resistor 110 is divided into $I_{11}$ and $I_{14}$. In the present embodiment, as the third resistor 140, a resistor having a resistance much greater than that of the second resistor 120 is used. Therefore, most of the supply current $I_{10}$ is $I_{11}$, which is divided into $I_{12}$ and $I_{13}$. In the low-voltage section, in which the input voltage ranges from 0 to 1500 V, the magnitude of the current $I_{12}$ is not high, which does not impose a burden on the Zener diode 150. Here, the first voltage, that is, 1500 V, may be arbitrarily set and changed, and in the present embodiment, the first voltage is set according to the magnitude of the current $I_{12}$ that does not impose a burden on the Zener diode 150. If the input voltage increases to 1500 V or more, $I_{10}$ increases, and $I_{12}$ increases accordingly, thus imposing a burden on the Zener diode 150.

To prevent such a burden, since the input voltage across the P and N buses reaches 1500 V, the switch 130 is turned on, as shown in FIG. 4B, thus allowing current to flow through the second resistor 120. Therefore, in the section (high-voltage section) in which the input voltage across the P and N buses ranges from 1500 V to 3000 V, the switch 130 is turned on and the line is shorted, and thus current flows through the second resistor 120, and the supply current $I_{10}$, applied to the first resistor 110, is divided into $I_{11}$, $I_{14}$, and $I_{15}$. Here, since the resistance of the third resistor 140 is much greater than that of the second resistor 120, most of the supply current $I_{10}$ become $I_{11}$ and $I_{15}$, and $I_{11}$ is divided again into $I_{12}$ and $I_{13}$. In this way, in the high-voltage section, in which the input voltage across the P and N buses ranges from 1.5 to 3 kV, part $I_{15}$ of the supply current $I_{10}$ is divided through the second resistor 120, so that the magnitude of the current $I_{12}$ supplied to the Zener diode 150 may be reduced, thus removing the burden on the Zener diode 150.

As described above, in the embodiment of the present invention, while the input voltage across the P and N buses increases from 0 to 3 kV (maximum voltage: Vmax), the switch 130 is turned off to prevent the current $I_{15}$ from flowing through the second resistor 120 until the input voltage reaches a voltage of 1.5 kV (first voltage), which is the threshold voltage imposing the burden on the Zener diode 150. After the input voltage has reached 1.5 kV, the switch 130 is turned on to allow the current $I_{15}$ to flow through the second resistor 120. By means of this operation, in the low-voltage section, in which the input voltage ranges from 0 to 1.5 kV, even if the switch 130 is turned off, the magnitude of the supply current $I_{10}$ is low, and the current $I_{12}$ is also low, and thus the current does not impose the burden on the Zener diode 150. In the high-voltage section, in which the input voltage ranges from 1.5 to 3 kV, the supply current $I_0$ becomes higher than that in the low-voltage section, so the switch 130 is turned on to allow part $I_{15}$ of the supply current $I_{10}$ to flow through the second resistor 120, thus reducing the magnitude of the current $I_{12}$ flowing through the Zener diode 150, with the result that the burden on the Zener diode 150 is removed. That is, the magnitude of $I_{15}$ increases while the input voltage continuously increases from 1.5 kV to 3 kV, thus preventing the current $I_{12}$ from exceeding a predetermined magnitude.

Thereafter, the switch 130 is continuously maintained in an ON state even while the first voltage decreases from the maximum voltage (Vmax), that is, 3 kV, to 1.5 kV, so that part $I_{15}$ of the supply current $I_{10}$ is divided through the second resistor 120, thus reducing the burden on the Zener diode 150 by reducing the magnitude of the current flowing through the Zener diode 150. When the input voltage decreases to the first voltage of 1.5 kV or less, loss in the second resistor 120 may be reduced and current $I_{11}$ may be maintained at a constant voltage even if the current flowing through the second resistor 120 is blocked by turning off the switch 130 due to the low input voltage. While the input voltage increases or decreases in a range from 0 V to 3 kV, the first voltage becomes a threshold voltage that imposes the burden on the Zener diode 150. Therefore, the switch 130 is turned on/off based on the first voltage, thus reducing loss occurring in the second resistor 120 while minimizing the burden that is imposed on the Zener diode 150.

Meanwhile, when the power control apparatus 100 according to the present invention further includes the current detection unit 180, the control unit allows the current detection unit 180 to detect the current $I_{12}$ flowing through the Zener diode 150 while the voltage across the P and N buses increases from 0 V to the maximum voltage (Vmax) in the state in which the switch 130 is initially turned off, and alternately performs on/off switching depending on the magnitude of the detected current $I_{12}$, thus enabling the supply of current to the second resistor 120 and the blocking of the supply of the current to be repeated. More specifically, the current $I_{12}$ flowing through the Zener diode 150 is maintained at or below a preset reference value by varying the duty ratio of ON/OFF switching of the switch 130. This is intended to adjust the amount of current $I_{12}$ flowing through the Zener diode 150 by the control unit suitably adjusting the ON/OFF duty ratio of the switch 130 and then repeating the supply of the current $I_{15}$ to the second resistor 120 and blocking of the supply of the current. In this way, the magnitude of the current $I_{12}$ flowing through the Zener diode 150 is actually measured, and the ON/OFF switching operation of the switch 150 is performed depending on the measured magnitude of the current $I_{12}$, and thus the amount of the current $I_{12}$ flowing through the Zener diode 150 may be more favorably adjusted than in the case where the ON/OFF switching operation of the switch 150 is performed based on the first voltage. This may favorably reduce the burden on the Zener diode 150.

Figure 5:
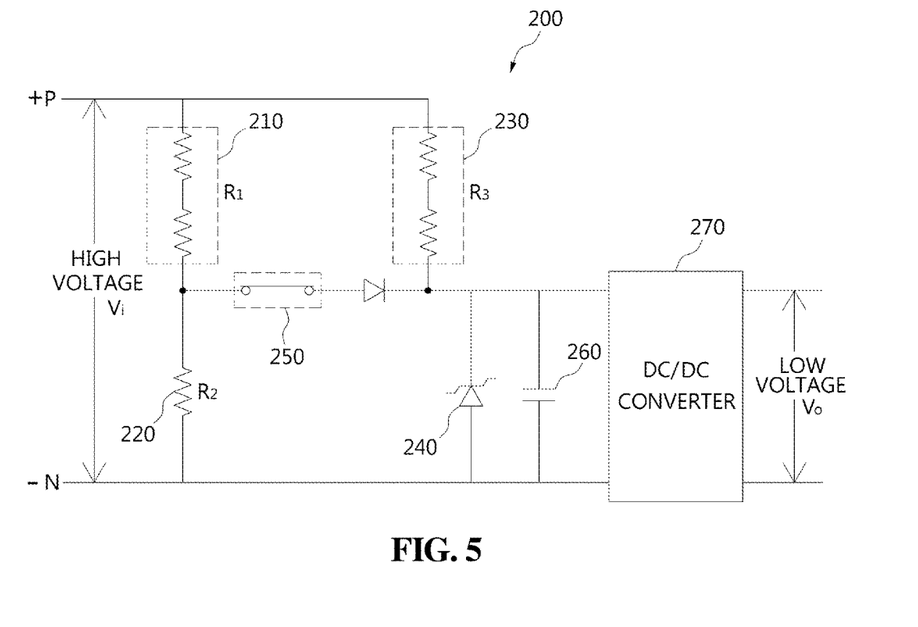
FIG. 5 is a circuit diagram showing a power control apparatus for sub-modules in an MMC according to a second embodiment of the present invention.

FIG. 5 is a circuit diagram of a power control apparatus for MMC sub-modules according to a second embodiment of the present invention.

Referring to FIG. 5, in a power control apparatus 200 for sub-modules in an MMC according to a second embodiment of the present invention, the MMC including one or more phase modules supplies power to operate multiple sub-modules constituting each phase module. For this operation, the power control apparatus 200 according to the present invention is configured to convert a high voltage across positive (+) P and negative (−) N buses, to which each phase module is connected, into the low voltage required for the operation of the sub-modules, and to supply the low voltage. Such an MMC is connected both to an HVDC system and to a STATCOM.

The power control apparatus 200 of the present invention includes at least one first resistor 210, connected between the P and N buses of the MMC, and a second resistor 220, connected in series with the first resistor 210. The first resistor 210 is implemented using one or more series-connected resistive elements. Further, the power control apparatus 200 includes at least one third resistor 230 connected in parallel with the first and second resistors 210 and 220, which are connected in series, and a Zener diode 240 connected in series with the third resistor 230. The third resistor 230 is also implemented using one or more series-connected resistive elements. The Zener diode 240 exhibits characteristics identical to those of a normal diode in a forward direction from the N bus to the P bus, but current does not flow through the Zener diode 240 (that is, only very low current flows) upon the application of reverse voltage. Then, when the voltage exceeds a Zener knee voltage, Zener breakdown occurs, and then the Zener diode is reversely biased and current flows through the Zener diode in the reverse direction. Therefore, referring to the drawing, although low current cannot flow in the reverse direction from the P bus to the N bus, reverse current flows in the direction from the P bus to the N bus when a reverse bias occurs.

Further, in the power control apparatus 200 according to the second embodiment of the present invention, a switch 250 is connected between the junction of the first resistor 210 and the second resistor 220 and the junction of the third resistor 230 and the Zener diode 240. This switch 250 may be implemented using a mechanical switch, a relay contact switch, or the like. When a relay contact switch is applied, it is connected in series with a diode so that the diode blocks the flow of reverse current. Although not shown in the drawing, the operation of the switch 250 is controlled by a control unit (not shown). That is, the control unit adjusts the magnitude of the current to be supplied to the Zener diode 240 by controlling the switching operation of the switch 250, thus reducing the burden on the Zener diode 240. In the present embodiment, the switch is implemented as, for example, a B contact switch, in which the initial state thereof is maintained in a shorted state. In this case, current passes through the switch. In the present embodiment, depending on the circumstances, the B contact switch may be operated and may then be opened under the control of the control unit (not shown). In this case, the flow of current is blocked. The control unit may include a relay unit.

Further, the power control apparatus 200 according to the second embodiment of the present invention includes a capacitor 260 and a DC/DC converter 270 individually connected in parallel with the Zener diode 240. The capacitor 260 functions to maintain a constant voltage. The DC/DC converter 270 receives voltage across both ends of the Zener diode 240, converts the voltage into a low voltage required for sub-modules, and supplies the low voltage to the sub-modules. Here, the voltage input to the DC/DC converter 270 is maintained at a constant value through the Zener diode 240 without being changed in magnitude depending on the ON/OFF switching operation of the switch 250.

Figure 6:
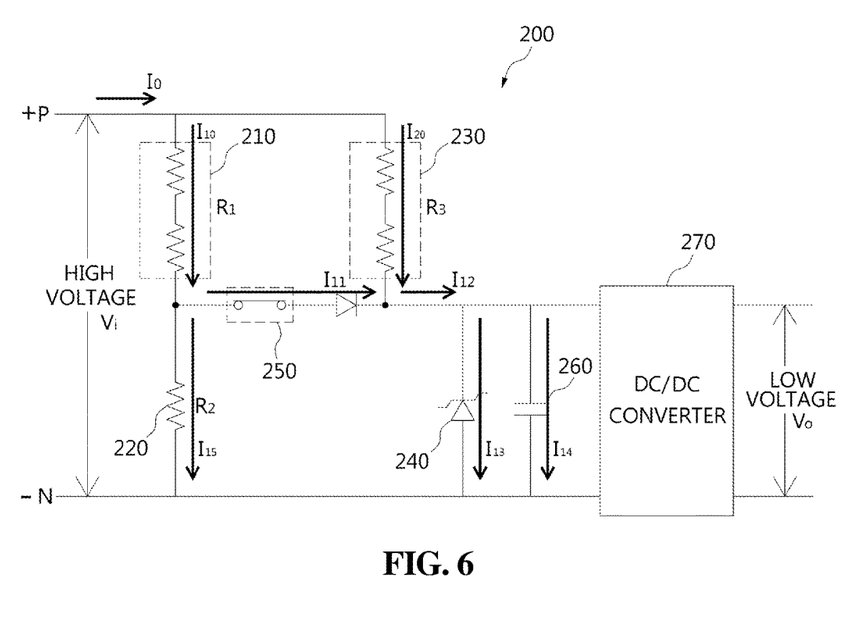
FIGS. 6 and 7 are schematic diagrams of current flow to describe the process in which the power control apparatus for sub-modules in an MMC according to the second embodiment of the present invention controls the power of the sub-modules.
Figure 7:
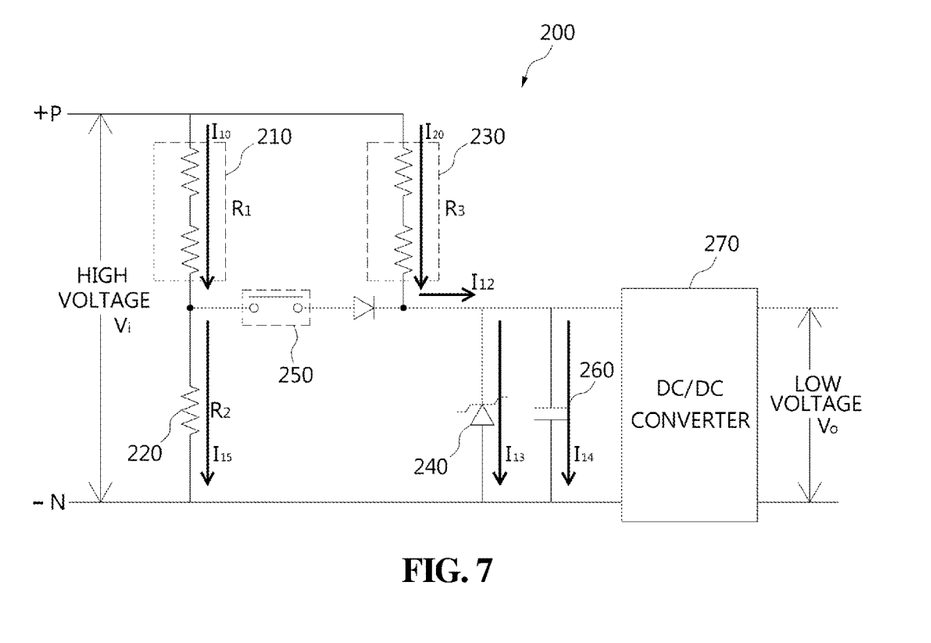

FIGS. 6 and 7 are schematic diagrams of current flow to describe a process in which the power control apparatus for sub-modules in an MMC according to the second embodiment of the present invention controls the power of the sub-modules.

FIG. 6 illustrates current flow in the state in which the switch 250 is turned off in a low-voltage section, in which an input voltage across P and N buses is low, and FIG. 7 illustrates current flow in the state in which the switch 250 is turned on in a high-voltage section.

Referring to FIG. 6, the power control apparatus 200 for MMC sub-modules according to the second embodiment of the present embodiment is intended to reduce the burden on the Zener diode 240 by adjusting the magnitude of current flowing through the Zener diode 240 depending on the ON/OFF switching operation of the switch 250. The high voltage across the P and N buses of the MMC applied to the present embodiment increases or decreases in a range from 0 V to a preset maximum voltage Vmax. For the convenience of description, the maximum voltage Vmax will be described as, for example, 3 kV. Therefore, in the second embodiment of the present invention, the power control apparatus 200 is configured to receive the high voltage across the P and N buses of the MMC, for example, an input voltage of 0 V to 3 kV, convert the high voltage into a low voltage of 300 to 400 V, required for the sub-modules, and supply the low voltage to the sub-modules.

For this operation, as shown in FIG. 6, in the present embodiment shown in FIG. 6, current $I_0$ supplied by the input voltage across the P and N buses is divided into current $I_{10}$ to be supplied to the first resistor 210 and current $I_{20}$ to be supplied to the third resistor 230. Here, the power control apparatus 200 according to the present embodiment causes the switch 250 to be initially shorted. For example, when the switch 250 is implemented as a B contact switch, the switch 250 is initially turned off and is maintained in a shorted state. In this way, in the state in which the contact of the switch 250 is shorted, current passes through the switch. Therefore, in the section (low-voltage section) in which the input voltage across the P and N buses increases from 0 V to 1500 V (hereinafter referred to as a 'first voltage'), the current $I_{10}$ supplied to the first resistor 210 is divided into $I_{11}$ and $I_{15}$, and the current $I_{11}$ is added to the current $I_{20}$ supplied to the third resistor 230, and thus current $I_{12}$ is generated. The second resistor 220 is implemented to have very high resistance, and thus most of the current $I_{10}$ is $I_{11}$. Further, in the present embodiment, the resistance of the third resistor 230 is implemented to be much greater than that of the first resistor 210. Therefore, most of the supply current $I_0$ becomes current $I_{10}$. The current $I_{12}$ is divided again into current $I_{13}$ flowing through the Zener diode 240 and current $I_{14}$ flowing through the capacitor 260.

In this way, since the magnitude of the current I0 is not high in the low-voltage section, in which the input voltage across the P and N buses ranges from 0 to 1500 V, the magnitude of the current $I_{13}$ flowing through the Zener diode 240 is also low, thus removing the burden on the Zener diode 240. Therefore, the first voltage of 1500 V is determined according to the magnitude of the current $I_{13}$ that does not impose a burden on the Zener diode 240. If the input voltage increases to 1500 V or more, the current $I_0$ increases and $I_{13}$ also increases, thus imposing a burden on the Zener diode 240.

To prevent this burden, since the input voltage across the P and N buses reaches 1500 V, the contact of the switch is opened by turning on the switch 250, as shown in FIG. 7, thus preventing the current $I_{10}$ flowing through the first resistor 210 from being supplied to the Zener diode 240. This shows an example in which the switch 250 is implemented as a B contact switch. In the present invention, it is important to block the flow of current by opening the contact when the input voltage reaches 1500 V. At this time, the current $I_{20}$ supplied to the second resistor 220 becomes the current $I_{12}$, which is supplied to the Zener diode 240 and to the capacitor 260. Therefore, in the section (high-voltage section) in which the input voltage across the P and N buses ranges from 1500 V to 3000 V, the switch 250 is opened, and thus the current $I_{10}$ supplied to the first resistor 210 directly flows through the second resistor 220, and the current $I_{20}$ supplied to the third resistor 230 is subsequently divided into $I_{13}$ and $I_{14}$.

In this way, in the high-voltage section, in which the input voltage across the P and N buses ranges from 1.5 kV to 3 kV, the switch 250 is opened to allow the supply current $I_0$ to be divided into $I_{10}$ and $I_{20}$, and allow the current $I_{20}$ to be further divided into $I_{13}$ and $I_{14}$, so that the magnitude of the current $I_{13}$ supplied to the Zener diode 240 may be reduced, thus removing the burden on the Zener diode 240.

Further, as described above, the supply current $I_0$ is divided into $I_{10}$ and $I_{20}$, thus reducing the loss occurring in the third resistor 230. By means of this, it can be seen that, compared to the conventional technology, in which all of the supply current flows into the resistor, and then loss occurring in the corresponding resistor is very large in the high-voltage section, the present embodiment shows that the supply current is divided, so that the magnitude of the current $I_{20}$ supplied to the third resistor 230 is reduced, and thus loss proportional to current $I^2$ is remarkably reduced.

As described above, in the present embodiment of the present invention, while the input voltage across the P and N buses increases from 0 to 3 kV (maximum voltage: Vmax), the switch 250 is shorted to enable part of the current $I_{10}$ and $I_{20}$, supplied respectively to the first and third resistors 210 and 230, to be supplied to the Zener diode 240 until the input voltage reaches 1500 V (the first voltage), which is the threshold voltage that imposes the burden on the Zener diode 240. After the input voltage has reached 1500 V, the switch 250 is opened, thus blocking the current $I_{10}$ supplied to the first resistor 210 and enabling part $I_{14}$ of only the current $I_{20}$ supplied to the third resistor 230 to be supplied to the Zener diode 240. By means of this operation, in the low-voltage section, in which the input voltage ranges from 0 to 1500 V, even if the switch 250 is shorted, the magnitude of the supply current $I_0$ is low, and $I_{13}$ is also low, thus removing the burden on the Zener diode 240. In the high-voltage section, in which the input voltage ranges from 1500 V to 3000 V, the supply current $I_0$ becomes higher than that in the low-voltage section, and thus part of only the supply current $I_{20}$ is caused to flow through the Zener diode 240 by opening the switch 250, and the magnitude of the current $I_{13}$ is decreased, thereby removing the burden on the Zener diode 240. In this case, since the magnitude of the current $I_{20}$ supplied to the third resistor 230 is reduced, loss occurring in the third resistor 230 is also reduced compared to the conventional technology.

Thereafter, while the first voltage decreases to 1500 V after operation is performed at a maximum voltage Vmax of 3000 V, the switch 250 is continuously maintained in an open state, so that the supply current $I_0$ is divided into $I_{10}$ and $I_{20}$, thus reducing the burden on the Zener diode 240. When the input voltage reaches the first voltage of 1500 V, the switch 250 is shorted, and the current $I_{10}$ supplied to the first resistor 210 is added to the current $I_{20}$ supplied to the third resistor 230, and then $I_{12}$ is generated. Part of the current $I_{12}$ is supplied to the Zener diode 240.

In the above description, although a description has been made such that all components constituting embodiments of the present invention are combined into a single component or are operated with the components being combined with each other, the present invention is not limited to those embodiments. That is, within the scope of the present invention, one or more of all components may be selectively combined and operated. Further, it should be understood that terms such as "comprise", "include" or "have" are merely intended to indicate that the corresponding component is internally present, unless a description to the contrary is specifically pointed out in context, and are not intended to exclude the possibility that other components may be additionally included. Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

The above description is merely intended to exemplarily describe the technical spirit of the present invention, and those skilled in the art will appreciate that various changes and modifications are possible without departing from the essential features of the present invention. Therefore, the embodiments disclosed in the present invention are not intended to restrict the technical spirit of the present invention and are merely intended to describe the present invention, and the scope of the present invention is not limited by those embodiments. The protection scope of the present invention should be defined by the accompanying claims, and all technical spirit of equivalents thereof should be construed as being included in the scope of the present invention.

The invention claimed is:

1. A power control apparatus for sub-modules in a Modular Multilevel Converter (MMC), comprising:
   at least one first resistor connected between P and N buses of the MMC;
   a second resistor connected in series with the at least one first resistor;
   a switch connected in series with the second resistor;
   a third resistor connected in parallel with the second resistor and the switch, wherein the second resistor and the switch are connected in series;
   a Zener diode connected in parallel with the third resistor; and
   a DC/DC converter connected between both ends of the Zener diode and configured to convert voltage across both ends of the Zener diode into a low voltage, and supply the low voltage to the sub-modules,
   wherein a magnitude of current flowing through the Zener diode is controlled depending on ON/OFF switching of the switch,
   wherein voltage across the P and N buses increases or decreases in a range from 0 to a preset maximum voltage, and in a low-voltage section, in which the voltage across the P and N buses ranges from 0 V to a first voltage, the switch is turned off, thus preventing current from flowing through the second resistor.

2. The power control apparatus of claim 1, wherein the third resistor has a resistance greater than that of the second resistor.

3. The power control apparatus of claim 1, wherein, in a high-voltage section, in which the voltage across the P and N buses ranges from the first voltage to the maximum voltage, the switch is turned on, thus enabling current to flow through the second resistor.

4. The power control apparatus of claim 1, wherein the first voltage is determined according to a magnitude of current flowing through the Zener diode.

5. The power control apparatus of claim 1, further comprising a current detection unit for detecting a magnitude of current flowing through the Zener diode,
   wherein, in a state in which the switch is initially turned off, voltage across the P and N buses increases from 0 V to the preset maximum voltage, and the switch alternately performs on/off switching depending on the current flowing through the Zener diode, detected by the current detection unit, thus enabling supply of the current to the second resistor and blocking of the supply of the current to be repeated.

6. The power control apparatus of claim 5, wherein the current flowing through the Zener diode is maintained at or below a preset reference value by varying a duty ratio of ON/OFF switching of the switch.

7. A power control apparatus for sub-modules in a Modular Multilevel Converter (MMC), comprising:
   at least one first resistor connected between P and N buses of the MMC;
   a second resistor connected in series with the at least one first resistor;
   at least one third resistor connected in parallel with the first resistor and the second resistor, wherein the second resistor and the switch are connected in series;
   a Zener diode connected in series with the third resistor;
   a switch connected between a junction of the first resistor and the second resistor and a junction of the third resistor and the Zener diode; and a DC/DC converter connected between both ends of the Zener diode and configured to convert voltage across both ends of the Zener diode and transmit a resulting voltage to sub-modules, wherein a magnitude of current flowing through the Zener diode is controlled depending on ON/OFF switching of the switch.

8. The power control apparatus of claim 7 wherein the third resistor has a resistance greater than that of the second resistor.

9. The power control apparatus of claim 7, wherein voltage across the P and N buses increases or decreases in a range from 0 to a preset maximum voltage.

10. The power control apparatus of claim 9, wherein, in a low-voltage section, in which the voltage across the P and N buses ranges from 0 V to a first voltage, the switch is shorted, thus enabling current flowing through the first resistor and current flowing through the third resistor to flow through the Zener diode.

11. The power control apparatus of claim 10, wherein, in a high-voltage section, in which the voltage across the P and N buses ranges from the first voltage to the maximum voltage, the switch is opened, thus preventing the current flowing through the first resistor from being supplied to the Zener diode and enabling the current flowing through the third resistor to flow through the Zener diode.

12. The power control apparatus of claim 10, wherein the first voltage is determined according to a magnitude of the current flowing through the Zener diode.

13. The power control apparatus of claim 7, further comprising a diode connected in series with the switch.

14. The power control apparatus of claim 3, wherein the first voltage is determined according to a magnitude of current flowing through the Zener diode.

15. The power control apparatus of claim 11, wherein the first voltage is determined according to a magnitude of the current flowing through the Zener diode.

* * * * *